(12) United States Patent
Klosinski et al.

(10) Patent No.: US 7,770,459 B2
(45) Date of Patent: Aug. 10, 2010

(54) DIFFERENTIAL PRESSURE DIAGNOSTIC FOR PROCESS FLUID PULSATIONS

(75) Inventors: Andrew Juri Klosinski, Waconia, MN (US); Joel Robert Lemke, Minneapolis, MN (US)

(73) Assignee: Rosemount Inc., Eden Prairie, MN (US)

(*) Notice: Subject to any disclaimer, the term of this patent is extended or adjusted under 35 U.S.C. 154(b) by 0 days.

(21) Appl. No.: 12/218,803

(22) Filed: Jul. 18, 2008

(65) Prior Publication Data

US 2010/0011869 A1 Jan. 21, 2010

Related U.S. Application Data

(60) Provisional application No. 60/961,540, filed on Jul. 20, 2007.

(51) Int. Cl.
*G01L 13/02* (2006.01)
(52) U.S. Cl. ............................... 73/716; 73/736
(58) Field of Classification Search ................ None
See application file for complete search history.

(56) References Cited

U.S. PATENT DOCUMENTS

| | | | |
|---|---|---|---|
| 4,654,813 A | 3/1987 | Edlund et al. |
| 5,209,258 A | 5/1993 | Sharp et al. |
| 5,420,578 A | 5/1995 | O'Brien et al. |
| 5,481,924 A | 1/1996 | Sparks et al. |
| 5,560,550 A | 10/1996 | Krawczyk |
| 5,956,663 A | 9/1999 | Eryurek |
| 6,017,143 A | 1/2000 | Eryurek et al. |
| 6,047,220 A | 4/2000 | Eryurek |
| 6,119,047 A | 9/2000 | Eryurek et al. |
| 6,213,711 B1 | 4/2001 | Muller et al. |
| 6,397,114 B1 | 5/2002 | Eryurek et al. |
| 6,532,392 B1 | 3/2003 | Eryurek et al. |
| 6,539,267 B1 | 3/2003 | Eryurek et al. |
| 6,543,227 B2 | 4/2003 | He et al. |
| 6,601,005 B1 | 7/2003 | Eryurek et al. |
| 6,654,697 B1 | 11/2003 | Eryurek et al. |
| 6,663,353 B2 | 12/2003 | Lipscomb et al. |
| 6,754,601 B1 | 6/2004 | Eryurek et al. |
| 6,907,383 B2 | 6/2005 | Eryurek et al. |
| 7,010,459 B2 | 3/2006 | Eryurek et al. |
| 7,079,984 B2 | 7/2006 | Eryurek et al. |
| 7,085,610 B2 | 8/2006 | Eryurek et al. |
| 7,181,654 B2 | 2/2007 | Ford, Jr. et al. |
| 7,254,518 B2 | 8/2007 | Eryurek et al. |
| 7,389,204 B2 | 6/2008 | Eryurek et al. |

(Continued)

OTHER PUBLICATIONS

Durke et al. An Assessment of Technology for Correcting Pulsation-Induced Orifice Flow Measurement. Southwest Research Institute, Report No. TA 91-1, Nov. 1991.

(Continued)

*Primary Examiner*—Andre J Allen
(74) *Attorney, Agent, or Firm*—Kinney & Lange, P.A.

(57) ABSTRACT

A process pulsation diagnostic system comprises a primary element, a sensor and a processor. The primary element generates a differential pressure along a fluid flow. The sensor samples the differential pressure. The processor generates a pulsation diagnostic based on a standard deviation of the differential pressure, such that the pulsation diagnostic is indicative of a degree of process pulsation in the fluid flow.

27 Claims, 6 Drawing Sheets

U.S. PATENT DOCUMENTS

| | | |
|---|---|---|
| 2004/0267395 A1 | 12/2004 | Discenzo et al. |
| 2005/0173112 A1 | 8/2005 | Kavaklioglu et al. |
| 2005/0197806 A1 | 9/2005 | Eryurek et al. |
| 2005/0229716 A1* | 10/2005 | Unsworth et al. ........ 73/861.53 |
| 2005/0267710 A1 | 12/2005 | Heavner, III et al. |
| 2006/0036404 A1 | 2/2006 | Wiklund et al. |
| 2006/0277000 A1 | 12/2006 | Wehrs |
| 2007/0010900 A1 | 1/2007 | Kavaklioglu et al. |
| 2007/0069903 A1 | 3/2007 | Wehrs et al. |
| 2007/0088528 A1 | 4/2007 | Miller |
| 2007/0163362 A1 | 7/2007 | Wehrs et al. |
| 2008/0027678 A1 | 1/2008 | Miller |
| 2008/0082181 A1 | 4/2008 | Miller et al. |
| 2008/0082294 A1 | 4/2008 | Pihlaja et al. |

OTHER PUBLICATIONS

Sparks et al. Square Root Error Indicator Gage Line Effects. Southwest Research Institute, Technical Note, Apr. 1996.

Bell. Lost & Unaccounted Natural Gas: The Effect and Control of Pulsation in Natural Gas Measurement. PGI International, Houston, Texas; 1991.

Bell, Sr. Effects and Control of Pulsation in Gas Measurement. PGI International, Houston, Texas; 1991.

Durke et al. Orifice Meter Gage Line Distortions. Southwest Research Institute; 2002.

Official Search Report and Written Opinion of the International Searching Authority in counterpart foreign Application No. PCT/US2008/00820 filed Jul. 18, 2008.

* cited by examiner

US 7,770,459 B2

DIFFERENTIAL PRESSURE DIAGNOSTIC FOR PROCESS FLUID PULSATIONS

CROSS-REFERENCE TO RELATED APPLICATIONS

This application claims priority from Provisional U.S. Patent Application Ser. No. 60/961,540, entitled STEAM TURBINE BLADE WEAR DIAGNOSTIC, by Andrew J. Klosinski et al., filed Jul. 20, 2007.

Reference is made to U.S. patent application Ser. No. 12/218,805 by Andrew J. Klosinski entitled PRESSURE DIAGNOSTIC FOR ROTARY EQUIPMENT, filed on even date herewith and subject to common assignment.

BACKGROUND

The subject matter of this disclosure relates generally to fluid processing, and in particular to differential pressure devices for process flow measurement. Specifically, the invention concerns a differential pressure diagnostic for pressure pulsations in a fluid flow.

Pressure-based flow sensors provide utility across a wide range of industrial applications, including bulk fluid storage and transport, agriculture, environmental control, water and air distribution, food and beverage preparation, chemical and pharmaceutical production, and a range of manufacturing processes utilizing thermoplastics, glues, resins and other fluidic materials. Pressure measurements are also important to energy production and other hydrocarbon fuel applications, which involve a wide range of fluidic flows including natural gas, diesel, pulverized coal, water and steam.

Pressure sensing technologies range from simple spring gauges, strain gauges and other mechanical devices to advanced capacitive, piezoresistive and electrochemical sensors. In industrial systems, these are typically housed in a transmitter or other more generalized field device, which protects the sensor hardware and adds higher-order functionality such as signal processing and communications.

The most appropriate pressure measurement methods depend upon the properties of the process material and the demands of each particular processing application. In custody transfer, for example, differential pressure measurements are typically utilized to achieve flow sensitivity via Bernoulli's principle and other velocity-dependent effects. In energy production, on the other hand, gage and absolute pressure measurements are required to provide precision control of large-scale rotary equipment such as blowers, fans, compressors and turbines.

Many of these applications subject the process fluid to pressure pulsations, with frequencies ranging from a few Hertz to hundreds of Hertz or more. Process pulsations can substantially alter the relationship between measured differential pressure and flow rate, reducing operating efficiency and preventing process optimization. In custody transfer and other "cash-register" applications where pressure measurements are directly related to bottom line costs and revenue, pulsation-induced errors also have direct economic implications. As a result, there is a need for diagnostics that are sensitive to process pulsations over a wide frequency band, and applicable to an extensive range of fluid handling, fluid processing and fluid flow applications.

SUMMARY

This disclosure concerns a system for diagnosing process pulsations in a fluid flow, and a method for monitoring the pulsations. The system comprises a primary element, a sensor and a processor. The primary element generates a differential pressure along the fluid flow. The signal processor calculates the standard deviation of the differential pressure, and generates a pulsation diagnostic based on the standard deviation. The pulsation diagnostic indicates the degree of process pulsations in the fluid flow.

The monitoring method comprises sampling a differential pressure along a fluid flow and generating a pulsation diagnostic as a function of the differential pressure. Changes in the pulsation diagnostic are indicative of changes in the process pulsation, including changes in pulsation amplitude and frequency.

DETAILED DESCRIPTION

Figure 1:
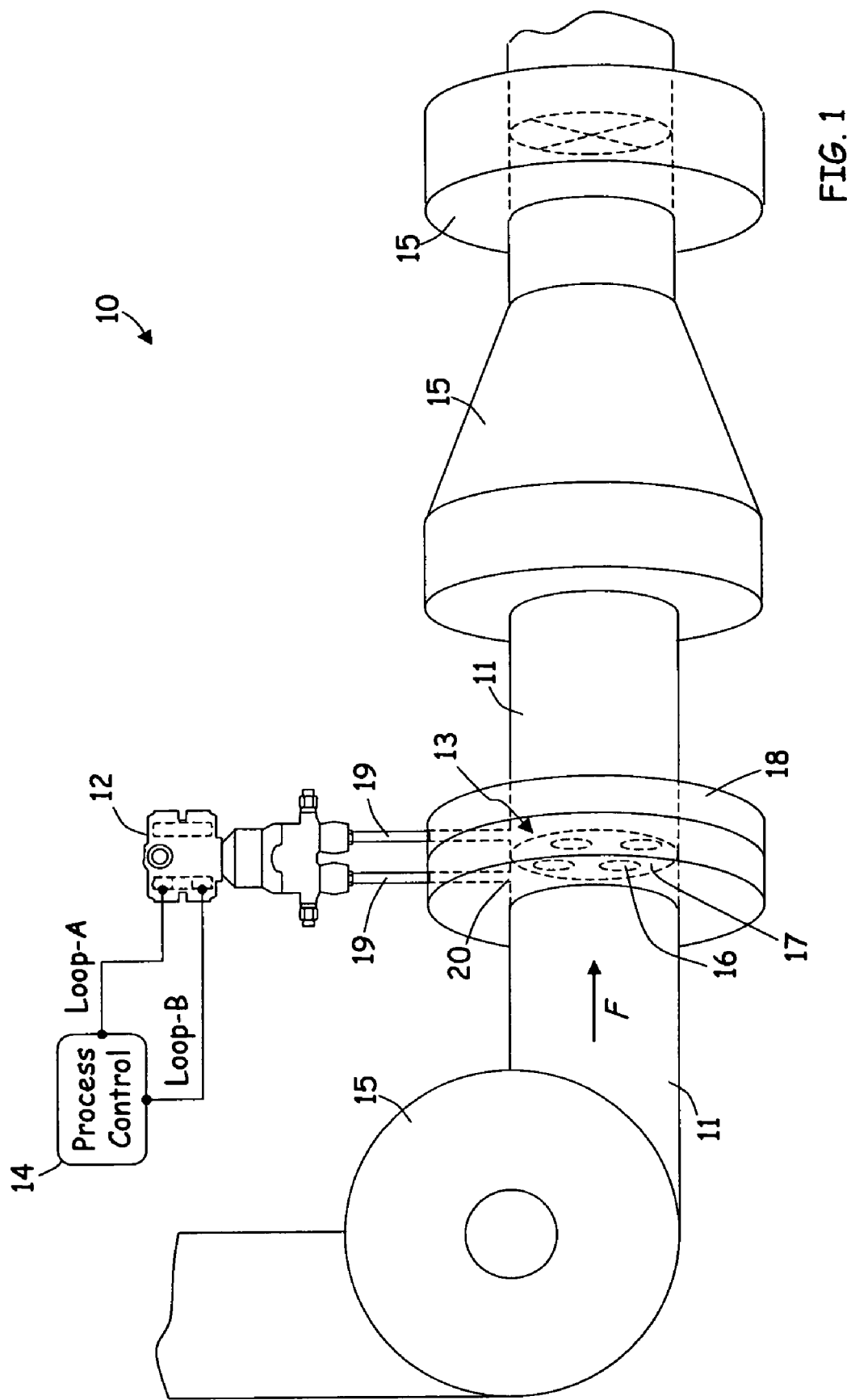
FIG. 1 is a schematic illustration of a system for diagnosing process pulsations in a flow conduit.

FIG. 1 is a schematic illustration of system 10 for diagnosing process pulsations in flow conduit 11. System 10 comprises pressure sensor/transmitter 12, primary element (or differential pressure generator) 13 and process system controller 14. Sensor/transmitter 12 generates a pulsation diagnostic as a function of the pressure across primary element 13, and transmits the diagnostic to process controller 14. The diagnostic indicates the degree of process pulsations inside conduit 11, which result, for example, from the operation of one or more apparatuses 15.

Flow conduit 11 comprises a process flow pipe, conduit or channel for process fluid flow. Flow conduit 11 is typically formed of a durable metal such as rolled steel, stainless steel, copper or aluminum, from a durable polymer such as ABS plastic (acrylonitrile butadiene styrene) or PVC plastic (polyvinyl chloride or polychloroethene), or from a combination thereof. In some applications flow conduit 11 forms an elongated structure with a circular cross-section, as shown in FIG. 1, but in other applications the geometry and composition of flow conduit 11 vary, depending upon the characteristics of the process fluid and the processing steps performed by apparatuses 15.

Pressure sensor/transmitter 12 comprises a differential pressure sensor configured to sample the differential pressure across primary element 13 (shown in hidden lines), in order to measure the fluid flow rate through conduit 11. Transmitter 12 also includes a signal processor, a statistical processor and an interface, which are described in more detail below with respect to FIG. 2, below.

In one embodiment, primary element 13 comprises an orifice plate for generating a differential pressure drop in response to fluid flow through conduit 11. In other embodiments, primary element 13 comprises any of an orifice plate, an orifice meter, a Pitot tube, an averaging Pitot tube, a Venturi tube, a shortened or otherwise modified Venturi tube, a wedge meter section or any other structure shaped to generate differential pressure in the flow though conduit 11, including a range of v-shaped, cone-shaped, wedge-shaped, toroidal and other primary element geometries.

Sensor/transmitter 12 samples the differential pressure across primary element 13 in order to measure the flow rate, such that the combination of transmitter 12 and primary element 13 functions as a flow transmitter or differential pressure-based flowmeter.

In orifice plate embodiments of primary element 13, the differential pressure generator comprises one or more orifices 16 formed into orifice plate 17. Orifice plate 17 is a generally planar structure manufactured of metal or another durable material, and typically conforms to the internal cross-sectional geometry of conduit 11. Orifices (openings) 16 provide for flow along conduit 11 through orifice plate 17. Representative orifice plate designs are available from a number of different commercial vendors, including Rosemount Inc. of Chanhassen, Minn., an Emerson Process Management company.

In the particular embodiment of FIG. 1, primary element 13 comprises conditioning orifice plate 17 with a number of off-center openings 16. This configuration limits sensitivity to swirl, secondary flows and velocity profile distortion, and is commercially available in the form of a Rosemount 1595 conditioning orifice plate. In alternate embodiments, orifice plate 17 has a single centered opening 16, as provided, for example, on a Rosemont model 1495 orifice plate or another commercially available design.

Process monitor/system controller 14 controls a fluid processing system comprising apparatuses 15. In some embodiments, process monitor/system controller 14 communicates with a single transmitter 12 via a two-wire loop comprising individual loop wires Loop-A and Loop-B, as shown in FIG. 1. In other embodiments, system controller 14 communicates with a number of different transmitters 12, either in series or parallel, utilizing any combination of control loops, data cables, data buses and other communications hardware, including infrared (IR), optical, radio-frequency (RF) and other wireless devices such as a Rosemount 1420 gateway.

In two-wire embodiments, communications between process monitor 14 and sensor/transmitter 12 typically utilize a 4-20 mA analog current signal protocol. In some of these embodiments, a series of digital signals are superimposed on the analog current, forming a HART®-based (Highway Addressable Remote Transducer) communications protocol. Alternatively, system controller 14 utilizes a range of analog, digital, and hybrid signal protocols, including HART®, Foundation™ Fieldbus, PROFI® BUS and PROFI® NET.

In the particular two-wire embodiment of FIG. 1, loop wires Loop-A and Loop-B carry a signal current of approximately four to twenty milliamps (4-20 mA), and provide a maximum operating voltage between approximately twelve and thirty volts (12-30 V, or from 10.5 V to 55 V with no load). The loop current is used both for process communications with system controller 14, and also to provide power to transmitter 12.

The nominal signal offset of about 4 mA provides a continuity test for the current loop, and reserves a dedicated power supply current of about 3 mA. At typical operating voltages, this limits transmitter operating power to about 18-36 mW or less. Alternatively, the offset is between five and ten milliamps (5-10 mA), and the operational power limit is about 50 mA or less. In these low-power embodiments, transmitter 12 requires less than one percent of the power rating of a typical incandescent nightlight.

Fluid processing apparatuses 15 comprise mechanical devices or equipment configured to change a pressure, temperature, flow rate, state of matter or other thermodynamic property of the process fluid inside conduit 11. Apparatuses 15 comprise compressors, fans, pumps, motors, turbines, engines, pump valves, relief valves, blowdown valves, check valves and other mechanical fluid processing equipment.

Apparatuses 15 typically execute rotary, reciprocating, or other periodic cycles on the process fluid, generating process pulsations that propagate along conduit 11. The process pulsations include periodic and quasi-periodic fluctuations or oscillations in the pressure, temperature, density or flow rate of the fluid inside conduit 11. Additional pulsations are generated by mechanical resonance and vibrations of processing elements coupled to sensor/transmitter 12, including conduit 11 and other process structures.

Primary element/differential pressure generator 13 is positioned inside process flow conduit 11 at coupling 18, and transmitter 12 is mounted across primary element 13 via impulse tubes 19 or other means of pressure coupling. Pressure ports or pressure taps 20 (shown with hidden lines) extend through both sides of coupling 18 to the interior of process conduit 11, allowing pressure sensor/transmitter 12 to sample the differential pressure across primary element 13.

In the particular embodiment of FIG. 1, coupling 18 is a flanged structure coupled together about orifice plate 17 using a gasket or gaskets and mechanical fasteners such as bolts. In alternate embodiments, coupling 18 is any structure that allows pressure sensor/transmitter 12 to be mounted or coupled to conduit 11, in order to sample the differential pressure across primary element 13.

Primary element 13 generates a differential pressure in response to fluid flow, for example across orifices 16 in orifice plate 17. Sensor/transmitter 12 samples the differential pressure across primary element 13 via pressure couplings 19 and pressure taps 20, in order to measure the flow rate through conduit 11. Note, however, that while the process fluid is shown flowing through conduit 11 in a particular downstream direction, this example is merely illustrative. In general, sensor/transmitter 12 is mountable in either an upstream or downstream direction with respect to any fluid processing apparatus 15.

Sensor/transmitter 12 provides a pulsation diagnostic that is correlated with the degree of process pulsations in the fluid flow, including their amplitude and frequency. In some embodiments, transmitter 12 also generates a pulsation alert or pulsation alarm, which indicates changes in the process pulsations based on changes in the pulsation diagnostic.

Figure 2:
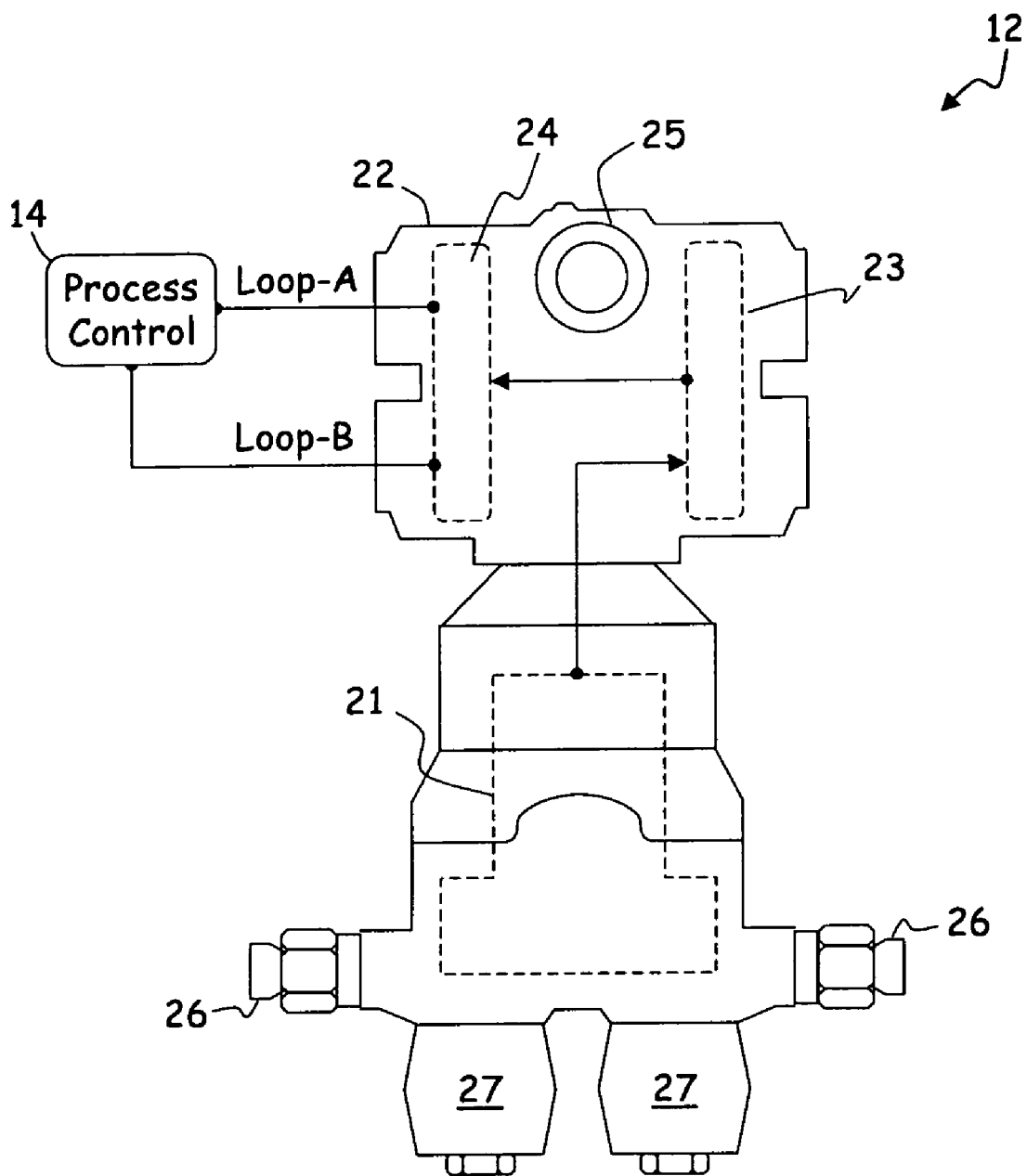
FIG. 2 is a schematic illustration of a pressure sensor configured for use in the system of FIG. 1.

FIG. 2 is a schematic illustration of differential pressure transmitter 12 with pressure sensor 21, as configured for use in system 10 of FIG. 1. Transmitter 12 comprises housing 22 with internal components including pressure sensor module 21, processor 23 and terminal block 24 (shown with hidden lines).

Primary sensor module 21 comprises a capacitive sensor, piezoresistive sensor, strain gauge, spring gauge or other device configured to generate a differential pressure signal as a function of process fluid flow. Sensor module 21 is sensitive to process pulsations exhibited in the differential pressure signal.

Housing 22 is formed from strong, durable, machinable materials such as aluminum, brass, steel and other metals, PVC plastics, ABS plastics and other durable polymers, and combinations thereof. These are shaped into a number of side walls, end walls, cover plates and other structures, creating an insulating and protective enclosure for pressure sensor 21, processor 23, terminal block 24 and the other internal components of transmitter 12. Typically, housing 22 also forms a pressure seal to prevent the entry of corrosive fluids, explosive gases and other hazardous agents.

Housing 22 provides electrical connections for transmitter 12, for instance via a terminal cover at terminal block 24. In some embodiments, the housing also provides a number of conduit connections 25. The process section of transmitter 12 typically provides bleed valves 26 and process fluid connections at flange adaptor couplings 27, or an alternative coupling structure such as a coupling nut for an impulse tube.

In one illustrative embodiment, housing 22 is configured for a 3051S pressure transmitter, as available from Rosemount Inc. In other embodiments, the specific configuration of housing 22 varies, in order to accommodate a variety of alternate component designs. In further embodiments, one or more components of sensor/transmitter 12 is provided in standalone form, and not contained within the same housing.

Processor 23 comprises a signal processor for generating a process pressure value and a statistical processor for generating a pulsation diagnostic and a pulsation indicator, each based on the differential pressure sensed by primary sensor 21. The signal and statistical processors are sometimes combined into a single microprocessor, and sometimes divided among various circuit components in an electronics stack or electronics assembly, such as a signal processor board and a statistical feature board.

Terminal block 24 is formed from an insulating body and a number of conducting terminals. The terminal block body is typically formed of a durable, machinable polymer such as plastic, and the terminals are typically formed of a conducting metal such as steel, brass or copper. Terminal block 24 connects transmitter 12 to process monitor/system controller 14 via loop wires Loop-A and Loop-B, or via other communications hardware as described above.

Figure 3:
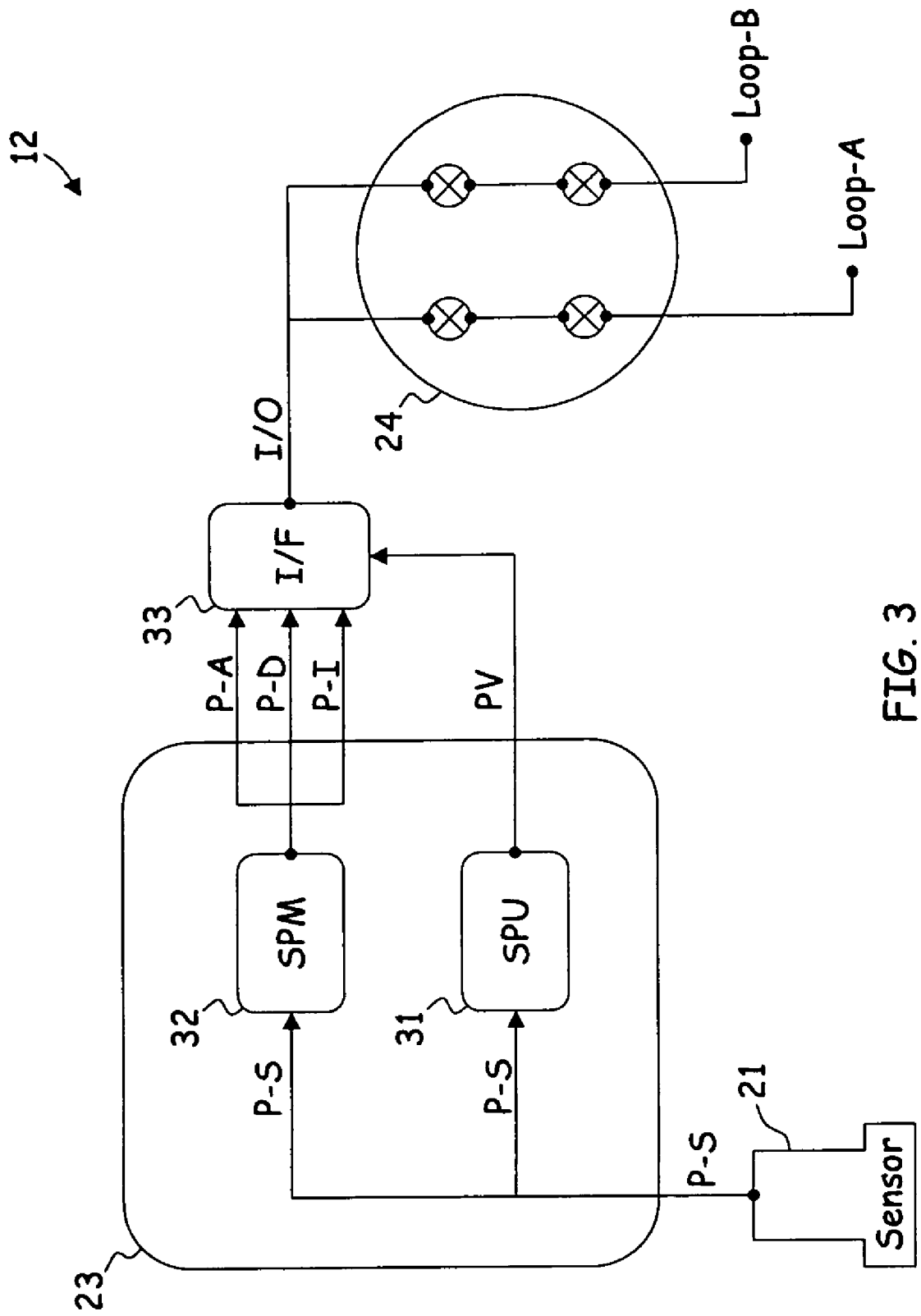
FIG. 3 is a schematic diagram of the pressure sensor in FIG. 2, illustrating one possible signal processing configuration.

FIG. 3 is a schematic diagram of differential pressure sensor 21 as embodied in transmitter 12 of FIG. 2, illustrating one possible signal processing configuration. In particular, FIG. 3 illustrates signal connections between primary sensor module 21 and processor 23, including signal processor 31 and statistical processor 32, and among the various components of processor 23, interface 33 and terminal block 24.

Typically, transmitter 12 also comprises a controller for configuring, zeroing or calibrating the transmitter, but controller signals are not shown in FIG. 3. In other embodiments, pressure sensor 21, processor 23 and interface 33 are standalone components not comprised within a transmitter, as described above.

Primary sensor module 21 generates sensor signal P-S as a function of thermodynamic contact with a process fluid. In some embodiments, primary sensor module 21 generates a continuous analog sensor signal, such as an analog voltage from a capacitive pressure sensor or an analog current from a piezoresistive pressure sensor, and produces a series of digital signals P-S by clocking an analog-to-digital (A/D) converter (or ADC). In other embodiments, pressure signal P-S is delivered to processor 23 as an analog signal, and is digitized by one or more processor components.

Pressure signals P-S represent the differential pressure across primary sensor module 21. The differential pressure has two components: an average (or mean) pressure, and process pressure noise, which varies or fluctuates about the average. The average process pressure generally varies on a relatively long time scale, as compared to the rotational period of the rotary equipment operating on the fluid. Process pressure noise, on the other hand, typically occurs on a much shorter time scale, due to process pulsations and other periodic or quasi-periodic pressure oscillations. There are also independent signal noise effects, which are generally aperiodic in nature and governed by unrelated time scales.

Signal processor (SPU) 31 generates process pressure PV (the primary process variable) by calculating a running average of a number of digital sensor signals P-S, or by integrating an analog pressure signal. In some embodiments, process pressure PV is generated in arbitrary units, and in other embodiments PV is a calibrated in a standard pressure scale such as Pascals or inches of water. In some of these embodiments, transmitter 12 also comprises a temperature sensor, which is used to provide temperature compensation for process pressure PV.

In the embodiment of FIG. 3, statistical processor module (SPM) 32 generates three different outputs. These are average pressure P-A, pulsation diagnostic P-D and pulsation indicator P-I. Average pressure P-A represents mean pressure <P>, as calculated over a series of pressure signals P-S. Pulsation diagnostic (or statistical diagnostic) P-D is a statistical function of the pressure signals, and indicates the degree of process pulsations. This is accomplished via correlation with a function of flow measurement error, such as the square root error or the root-mean-square of the differential pressure, as described below. Pulsation indicator P-I functions as a warning or alarm/alert output, which selectively indicates changes in the degree of process pulsations based on changes in pulsation diagnostic P-D.

Signal processor (SPU) 31 communicates process pressure PV to input/output interface (I/F) 33. Interface 33 generates a corresponding process output for a process monitor or system controller, for example an analog current transmitted over loop wires Loop-A and Loop-B via terminal block 24. Similarly, SPM 32 communicates average pressure P-A, pulsation diagnostic P-D and pulsation indicator P-I to interface 33, and interface 33 generates additional corresponding process outputs, for example digital signals superimposed on the analog current. Alternative analog and digital communication protocols are also utilized, as described above.

The data rates for process pressure PV and SPM outputs P-A, P-D and P-I are limited by the sampling and integration times of sensor 21 and associated A/D converter components, and by the computational capabilities of signal processor (SPU) 31 and statistical processor (SPM) 32. These capabilities, in turn, are limited by the total power available to transmitter 12.

Process variables such as PV are typically updated on a substantially continuous basis, based on the sampling period of sensor 21 and the processing time for SPU 31. In some embodiments, the sampling period is between about one tenth of a second and about one second (about 0.1-1.0 s), corresponding to a sampling rate between about one and about ten Hertz (about 1-10 Hz). In other embodiments, the sampling period is between about forty milliseconds and about one hundred milliseconds (about 40-100 ms), corresponding to a sampling rate between about ten and about twenty-five Hertz (10-25 Hz). In one of these embodiments, the sampling period is about 45 ms, corresponding to a sampling frequency of about 22.2 Hz.

Diagnostic outputs from SPM 32 are updated on a periodic basis. In some embodiments, the output rate for average pressure P-A, diagnostic P-D and indicator P-I is between about a tenth of a Hertz and about one Hertz (0.1-1.0 Hz), corresponding to a diagnostic period of about one to ten seconds (1-10 s). In one of these embodiments, the diagnostic output rate is about one Hertz (1 Hz), corresponding to a diagnostic period of about one second (1 s).

Pressure signals P-S from sensor module 21 are subject to both mechanical and electronic damping. Mechanical damping includes external damping in impulse tubing and related pressure coupling structures, and internal damping within transmitter 12 itself, for example in an oil-filled three-spring pressure coupling mechanism. Mechanical damping tends to reduce the effects of higher-frequency pulsations, but sensor 21 remains sensitive to these pulsations in the form of variation of the pressure signal, particularly in environments associated with pulsation-induced flow measurement errors.

Electronic damping is typically achieved via filter circuitry in sensor 21, which shapes pressure signal P-S. In some embodiments, electronic damping is also provided by signal processor (SPU) 31, but this depends upon transmitter and sensor configuration. In further embodiments, statistical processor (SPM) 32 provides additional electronic damping, but the SPM outputs are also highly dependent on sampling effects such as aliasing and beat-related signals. These effects complicate the problem of pressure-based pulsation monitoring, particularly when the relevant pulsation frequency approaches or exceeds the sampling rate.

Figure 4A:
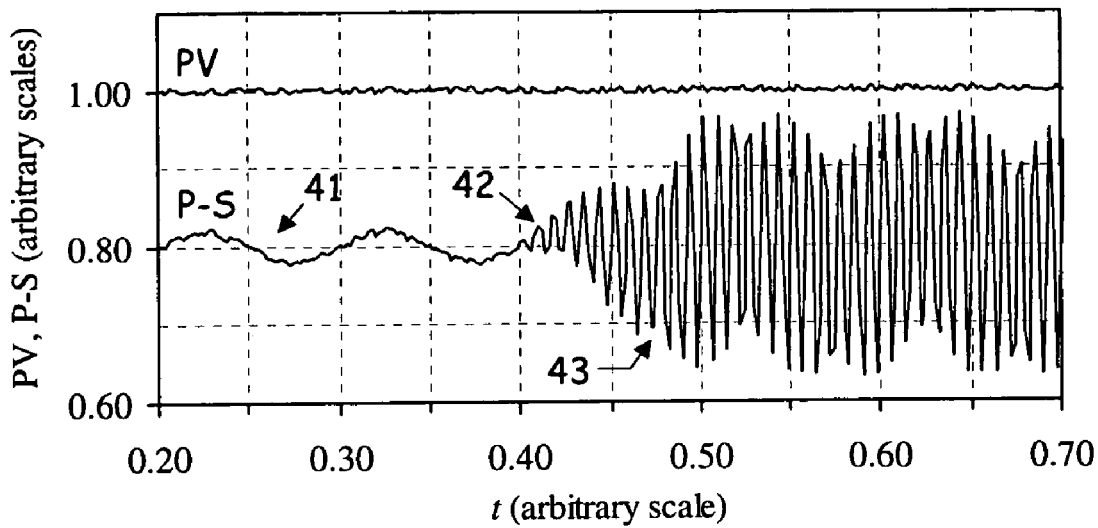
FIG. 4A is a plot of process pressure and pressure signal versus time, with an idealized (fast) sampling rate.

FIG. 4A is a representative plot of process pressure PV and pressure signal P-S versus time, with idealized (fast) pressure sampling. Process pressure PV and signal P-S appear on the vertical axis, with time in arbitrary units along the horizontal. Process pressure PV varies about a normalized and dimensionless value of one. This falls above the range of pressure signals P-S, but the two are not necessarily measured in the same units and in any case the vertical scale is also arbitrary.

In general, stability requires that process variables be relatively constant over short time scales, in order to avoid over-correction and oscillations due to feedback. Process pressure PV is thus both mechanically and electronically damped, as described above, with typical signal noise (or error) on the order of a few tenths of a percent or less. In particular, process pressure PV is not typically sensitive to process pulsations due to compressors, pumps, fans, valves and other rotary or reciprocal mechanical sources.

Individual pressure signals P-S, on the other hand, are sensitive to process pulsations with frequencies up to the sampling rate or higher. This includes relatively low degrees of background process pulsations, as exhibited in initial region 41, as well as changes in the pulsation environment, as illustrated by transition 42, and relatively high degrees of process pulsations, as exhibited in post-transition region 43.

In the idealized plot of FIG. 4A, the sampling rate is substantially higher than the frequency of the background signal. Thus the background appears as a relatively smooth sinusoidal curve in initial region 41, with a well-resolved frequency and relative amplitude of about four percent (4%). There is also a signal noise contribution in the form of a randomized aperiodic component, which is independent of the pulsation itself. In other embodiments the frequency, amplitude and signal noise vary, and the pulsations exhibit not only sinusoidal forms but also appear as square waves, triangular waves, sawtooth functions, delta-like pulsed functions, and combinations or superpositions thereof.

At transition 42, the background pulsation signal is joined by a higher frequency, higher amplitude primary pulsation signal, and through post-transition region 43 the background appears as a modulating envelope on the primary. In this idealized example, however, the sampling rate remains well above the highest primary pulsation frequency, and the two signals are each substantially resolved. In particular, the primary and background pulsation frequencies and amplitudes are directly observable in FIG. 4A from pressure signal P-S, even after transition 42. In more realistic diagnostic systems, this is not always possible.

Figure 4B:
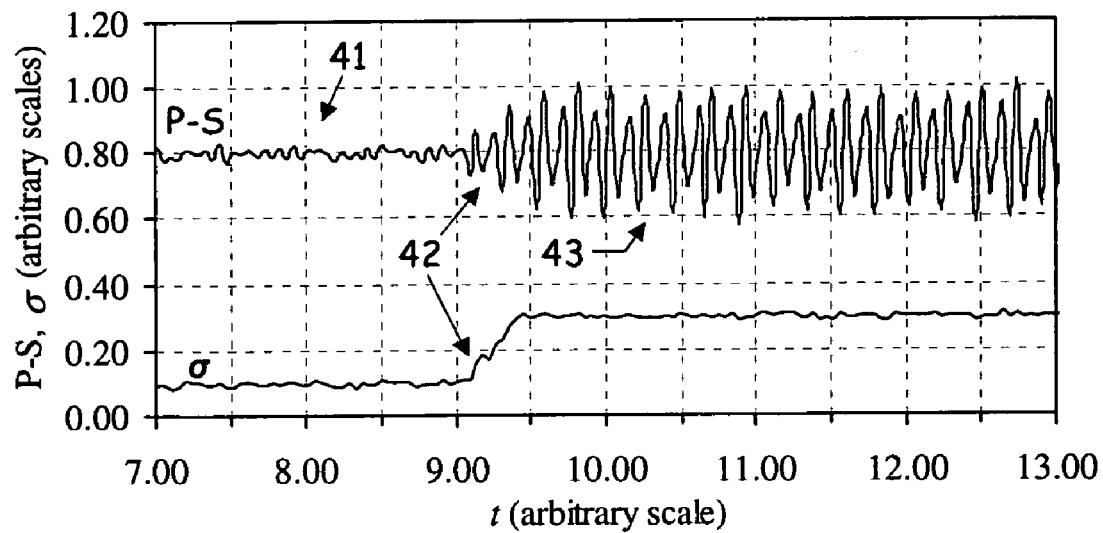
FIG. 4B is a plot of pressure signal and standard deviation versus time, with a more realistic (finite) sampling rate.

FIG. 4B is a plot of pressure signal P-S and standard (rms) deviation $\sigma$ versus time, with a more realistic (finite) sampling rate. Pressure signal P-S and rms deviation $\sigma$ each appear on the vertical axis, with time on the horizontal and both axes scaled in arbitrary units as in FIG. 4A, above.

FIGS. 4A and 4B are not limited to any particular sampling or pulsation frequency, but FIG. 4B nonetheless illustrates a particular example of the relevant effects. In this example, the background (low frequency) pulsation signal in initial region 41 has a frequency of about 10 Hz and relative amplitude of about 2%. After transition 42, it is joined by a primary (high frequency) pulsation signal with frequency of about 120 Hz and relative amplitude of about 20%. The sampling frequency is approximately 22.2 Hz, corresponding to a sampling period of about 45 ms. This falls between the relevant background and primary signal time scales.

In initial region 41, the sampling rate is still somewhat higher than the background pulsation frequency but pressure signals P-S no longer tracks a smooth curve. There is also a beat-dependent interference effect between the pulsation and sampling frequencies, which actually dominate the background signal and makes the original frequency difficult to resolve. This is an entirely non-physical artifact of the sampling rate, not due to the pulsation itself nor due to random (aperiodic) signal noise. After transition 42, the primary pulsation frequency exceeds the sampling rate and resolution further deteriorates.

Low-frequency background pulsations often correspond to physical oscillations or resonances within large-scale structures such as stacks and storage or reaction vessels, or in process flow conduits and impulse piping. Typically, these background oscillations have relatively low amplitude, but can be exhibited at long range. In addition, some higher-amplitude pulsations also occur at relatively lower frequency, for example in high-volume flow systems for large-scale gas turbine engines and other industrial equipment, or due to relatively low-frequency reciprocating compressor systems that operate below 60 Hz.

Higher-frequency pulsation signals are often caused by blowers, fans, centrifugal compressors, turbines and other rotating equipment, or from failing or poorly tuned control valves, dampers, and related flow control devices. These signals typically have relatively higher amplitude, but tend to dampen with distance. In some cases, however, high-frequency pulsation signals also exhibit long-range effects, particularly when processing system components are subject to resonant mechanical excitations.

When the sampling rate is not substantially greater than the relevant pulsation frequencies, individual contributions are hard to distinguish. In general, pulsation signals are not fully resolved when the sampling rate fails to satisfy the Nyquist relation, which requires that the sampling frequency be at least twice the signal frequency:

$$f_S \geq 2f \quad [1]$$

When sampling frequency $f_S$ is less than twice signal frequency $f$ (that is, when Eq. 1 is not satisfied), the signal frequency is not uniquely resolved. In this case, the signal waveform no longer occurs at the actual pulsation frequency but is instead aliased to a lower frequency, or, in some cases, may disappear altogether. Similar effects occur when the Nyquist relation is minimally satisfied but the processing time is insufficient to resolve beat effects between the sampling and the signal, as in initial region 41 of FIG. 4A.

Aliasing depends upon differences between the pulsation frequency and harmonics of the sampling rate. Specifically, aliasing occurs at frequencies $f_A$ that satisfy $$f_A = |f - N \times f_S|, \quad [2]$$

where N is the order of sampling frequency harmonic. In principle, Eq. 2 indicates that a single primary frequency can be aliased to a number of different harmonic orders. In practice, however, the analysis typically yields stronger signals at lower aliasing frequencies, emphasizing the nearest harmonics of sampling frequency $f_S$.

Because the Nyquist relation is not satisfied, the primary pulsation frequency is no longer evident in post-transition region 43, but is instead aliased to a lower value. The aliased frequency is given by the dominant beat contribution between the pulsation and a nearby harmonic of the sampling rate, which in this example is the fifth (N=5). This gives a nominal aliased frequency of 9 Hz (that is, 120 Hz−5×22.2 Hz).

Sampling, aliasing and beat effects are highly system dependent, however, and hard to generalize. As a result, the behavior of any particular pressure device is difficult to predict, particularly in the context of process flow measurements in a pulsation-heavy environment. For systems with a finite resolution time, for example, as opposed to an idealized (infinite) Fourier transform, the aliased signal typically appears at a relatively low-integer fraction of the sampling rate, rather than at the nominal frequency given by Eq. 2.

In FIG. 4B, for example, the aliased signal appears at 8.88 Hz, which is two-fifths of sampling frequency $f_S$, rather than at the frequency of 9 Hz predicted by Eq. 2. Both of these frequencies, moreover, are close to the background frequency, producing additional beat-like effects in post-transition region 43. As a result, it is nearly impossible to distinguish the background from the primary pulsation and sampling frequency effects.

The particular effects of sampling on flow measurement depend on Bernoulli's principle, which defines the basic relationship between differential pressure and flow rate. For a horizontal pipe section, the pressure drop along a flow streamline is related to the square of the change in flow velocity. Ignoring the gravitational potential, $$\Delta P = \frac{1}{2}\rho(v_d^2 - v_u^2), \quad [3]$$

where differential pressure $\Delta P$ (or simply DP) is the pressure drop, $\rho$ is the fluid density, and $v_u$ and $v_d$ are the upstream and downstream flow velocities, respectively.

In general, $\Delta P$ is defined as a positive-definite (or at least non-negative) number, as measured from the higher-pressure, lower-velocity upstream side of a flow constriction toward the lower-pressure, higher-velocity downstream side. That is, upstream flow velocity $v_u$ is lower than downstream velocity $v_d$, so the pressure drop is positive definite when there is fluid flow.

Continuity requires that the mass flow rate be conserved. This relates the change in flow velocity to the area of the flow stream and the fluid density, allowing the volume flow rate (Q) to be calculated as function of the square root of the differential pressure. Thus $$Q = kC\sqrt{\Delta P}, \quad [4]$$

where conversion factor k is determined by flowmeter geometry and the units of measurement, and discharge coefficient C accounts for non-uniform (non-flat) flow profiles, turbulence and pressure tap placement. In some embodiments, discharge coefficient C is also calibrated as a function of temperature, viscosity and density, in order to improve accuracy over a range of different flow conditions.

When process pulsations occur, they reduce accuracy in differential pressure measurements and introduce error into flow rate calculations. In particular, high-magnitude, high-frequency pulsations tend to increase the measured result, as compared to the actual flow. This has significant consequences for process control, particularly in custody transfer and other open-flow applications.

While the flow rate is proportional to the square root of the differential pressure, however, process pulsations are typically characterized in terms of the pressure magnitude. As a result, process pulsations and flow rates typically require independent error analysis, and independent diagnostic functions.

In this alternate approach, the problem is approached from a statistical perspective, using (for example) the standard (rms) deviation of the differential pressure signal and the coefficient of variation, which is the standard deviation divided by the mean pressure. That is, the coefficient of variation is essentially an inverse signal-to-noise ratio (or "noise-to-signal" ratio) of the differential pressure:

$$c_v = \frac{\sigma}{\langle \Delta P \rangle}, \quad [5]$$

where $\sigma$ is the standard (rms) deviation, $\langle \Delta P \rangle$ is the mean or average differential pressure and $c_v$ is the coefficient of variation. In general, mean differential pressure $\langle \Delta P \rangle$ is determined over a series of digital pressure signals, or by integrating an analog pressure signal. Standard (or rms) deviation $\sigma$ is calculated over the same data set, and includes both random signal noise and pulsation-induced effects.

For the square root of the differential pressure, an appropriate diagnostic standard is the normalized square root error ($E_R$). The normalized square root error is the difference between the square root of the mean and the mean of the square root, divided by the mean of the square root:

$$E_R = \frac{\sqrt{\langle \Delta P \rangle} - \langle \sqrt{\Delta P} \rangle}{\langle \sqrt{\Delta P} \rangle}. \quad [6]$$

For pressure-derived flow measurements, the square root error is relevant because the flow rate is proportional to the square root of the differential pressure. Unfortunately, this is difficult to relate to Eq. 5, because the mean of the square root is not the same as the square root of the mean, even before sampling effects are considered. In addition, the square root error is computationally intensive, making it difficult to produce with a sufficiently high diagnostic rate while maintaining real-time differential pressure sensitivity sufficient for process control-quality pressure measurements in a low-power environment.

The coefficient of variation and the square root error do have related functional forms, as shown by squaring Eq. 5 and expanding the standard deviation term. That is, $$c_v^2 + 1 = \frac{\langle \Delta P^2 \rangle}{\langle \Delta P \rangle^2}, \qquad [7]$$

where the numerator is the mean square of the differential pressure and the denominator is the square of the mean. Eq. 6 can be rewritten in similar form:

$$(E_R + 1)^2 = \frac{\langle \Delta P \rangle}{\left\langle \sqrt{\Delta P} \right\rangle^2}, \qquad [8]$$

where the numerator is the mean differential pressure and the denominator is the square of the mean root differential pressure.

While Eqs. 7 and 8 both include the mean pressure, however, there is no closed-form functional relationship between the mean square term of Eq. 7 and the mean square root term of Eq. 8, nor is there any predictable way to generate such a relationship. For distributions centered on zero, for example, the mean square root sometimes goes as the square root of the standard deviation, but differential pressure flow measurements require positive definite signals and Eq. 7 diverges when the mean goes to zero, while Eq. 8 goes to zero.

Sampling further complicates the problem by unpredictably affecting the pressure signals and statistical diagnostics based on them, including the standard deviation and coefficient of variation. This is particularly relevant for pulsation periods approaching half the sampling frequency, where aliasing and other sampling effects can dominate the signal.

As a result, the relationship between square root error $E_R$ and coefficient of variation $c_v$ must be determined empirically, based on simultaneous precision pressure and flow measurements in operating environments subject high degrees of process pulsations. Best practices in flow control suggest that the required precision is not easy to achieve in these environments, and empirical results are highly system-dependent. When the Nyquist relation is only minimally satisfied, moreover (for instance, when the sampling rate is less than about four times the pulsation frequency), there are no accurate a priori predictions for the detailed functional form of the correlation. Nonetheless, under certain flow conditions a definite relationship between the coefficient of variation and the square root error can be obtained, and an effective pressure-based pulsation diagnostic can be produced from this correlation.

Figure 5A:
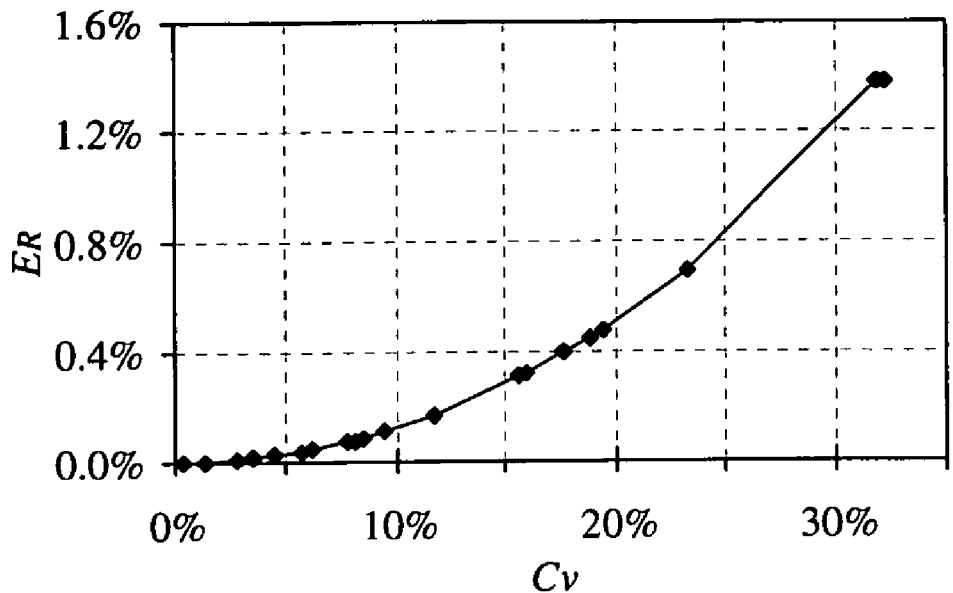
FIG. 5A is a plot showing a representative correlation between square root error and coefficient of variation.

FIG. 5A is a plot showing a representative correlation between normalized square root error and coefficient of variation. The normalized square root error lies along the vertical axis, and varies from zero to just under one and a half percent (about 0-1.5%). The coefficient of variation lies along the horizontal axis, and varies from zero to just under thirty-five percent (about 0-35%). This figure includes data from a number of different test stands and processing facilities, which were subject to process pulsation signals ranging from a few Hertz (less than half of the sampling rate) to a few hundred Hertz (five to ten times the sampling rate). The data also include both gaseous and liquid fluid flows, and are applicable to flows with a small multiphase component.

Over the plot range, the square root error is strongly correlated with the coefficient of variation. As a result, pulsation diagnostics based on either the coefficient of variation ($c_v$) or the standard deviation ($\sigma$) are indicative of the degree of process pulsations. In particular, changes in these pulsation diagnostics indicate changes in the process pulsation, including changes in the pulsation amplitude or frequency (equivalently, changes in the amplitude or period).

Because the square root of the pressure signal is directly proportional to the flow rate, correlation with the square root error provides these pulsation diagnostics with sensitivity to potential errors in flow measurements made across an orifice plate, Venturi tube or similar differential pressure generator. In particular, increases in the diagnostic values are indicative of an increased probability for flow rate error.

The correlation in FIG. 5A is substantially one-to-one and substantially monotonic, allowing an appropriate indicator threshold value to be generated from the correlation without actually calculating the square root error or performing other intensive computational steps. In particular, the square root error can be generated from either the standard deviation or the coefficient of variation by using a lookup table or a simple piecewise linear model.

In addition to the square root error, the AGA-3 (American Gas Association) standard for process flow measurements is also utilized. The AGA-3 standard is essentially a limit on the rms (root mean square) pressure differential, as compared to the mean. Typically, the limit is given by:

$$AGA\text{-}3: \quad \frac{\sqrt{\langle \Delta P^2 \rangle}}{\langle \Delta P \rangle} \leq 10\%, \qquad [9]$$

where the numerator is the rms differential pressure and the denominator is the mean. Because the rms is at least as great as the mean, this ratio is always greater than one, but the standard can be interpreted as a relative limit of ten percent excess, rather than an absolute limit on the ratio itself.

Figure 5B:
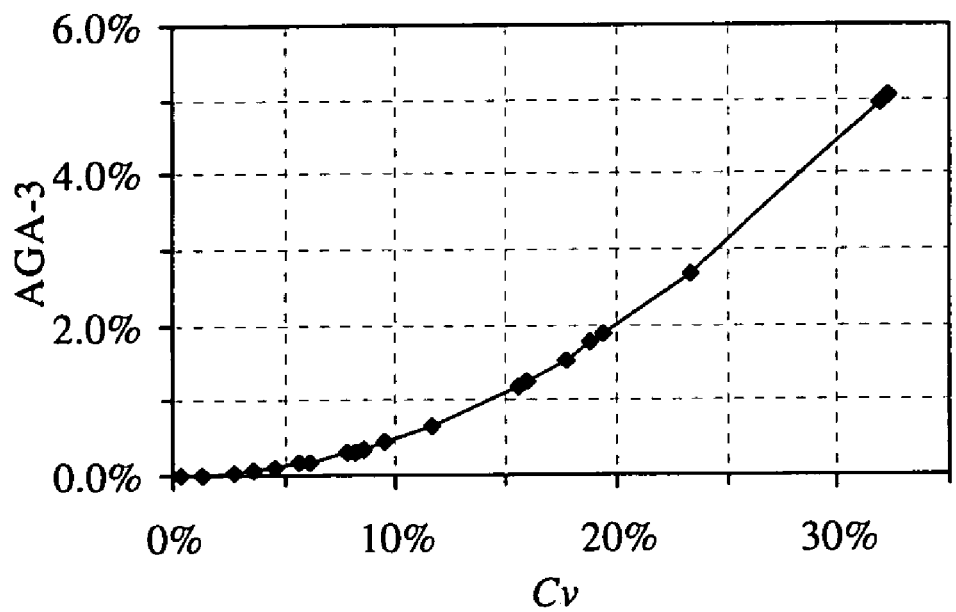
FIG. 5B is a plot showing a representative correlation between the AGA-3 pulsation standard and coefficient of variation.

FIG. 5B is a plot showing a representative correlation between root mean square pressure differential and coefficient of variation, using the same test data as in FIG. 5A. The AGA-3 standard lies along the vertical axis, and varies from zero to about five percent (0-5%). With respect to Eq. 7, this corresponds to a relative deviation of the rms differential pressure from the mean. The coefficient of variation lies along the horizontal axis, and varies from zero to just under thirty-five percent (0-35%).

Because the AGA-3 standard is based on the rms value of the pressure, it is more directly related to the coefficient of variation ($c_v$). Specifically, $$\frac{\sqrt{\langle \Delta P^2 \rangle}}{\langle \Delta P \rangle} = \sqrt{c_v^2 + 1}. \qquad [10]$$

Thus, in contrast to the square root error, there is an explicit (idealized) functional relationship between the AGA-3 standard and the coefficient of variation. Again, however, the relationship is ideal, and not achievable in a real system with limited sampling capability. In particular, the functional relationship of Eq. 10 does not hold when the pulsation frequency approaches half the sampling rate, when the differential pressure signal exhibits aliasing and other sampling effects.

Nonetheless, as shown in FIG. 5B it is possible under some flow conditions to establish an empirical correlation between the coefficient of variation and the rms pressure, allowing an alternate pulsation diagnostic to be generated. In particular, the correlation of FIG. 5B provides for pulsation indicators based on a diagnostic threshold corresponding to the AGA-3 standard, even when aliasing and other unpredictable sampling effects prevent it from being actually calculated. In addition, the substantially one-to-one and monotonic nature of the correlation allows the AGA-3 standard to be generated from the coefficient of variation (or from the standard deviation) via lookup table or model, as described above for the square root error.

In transmitter-based embodiments, explicit conversion of the pulsation diagnostic to another function such as square root error or root mean square (AGA-3 standard) is typically performed by an independent processor located in the process monitor or system controller. In alternate embodiments, however, a transmitter-based statistical processor performs the conversion. Similarly, while a transmitter-based processor typically generates pulsation indicators based on changes in the pulsation diagnostic, in some embodiments this function is performed by a process monitor or system controller external to the transmitter.

Note that the square root error and normalized rms correlations result in independent pulsation diagnostics. That is, while the functional relationships or correlations shown in FIGS. 5A and 5B may appear similar, they are quantitatively and qualitatively different. This is illustrated by comparison of the square root error and the AGA-3 standard.

Figure 6:
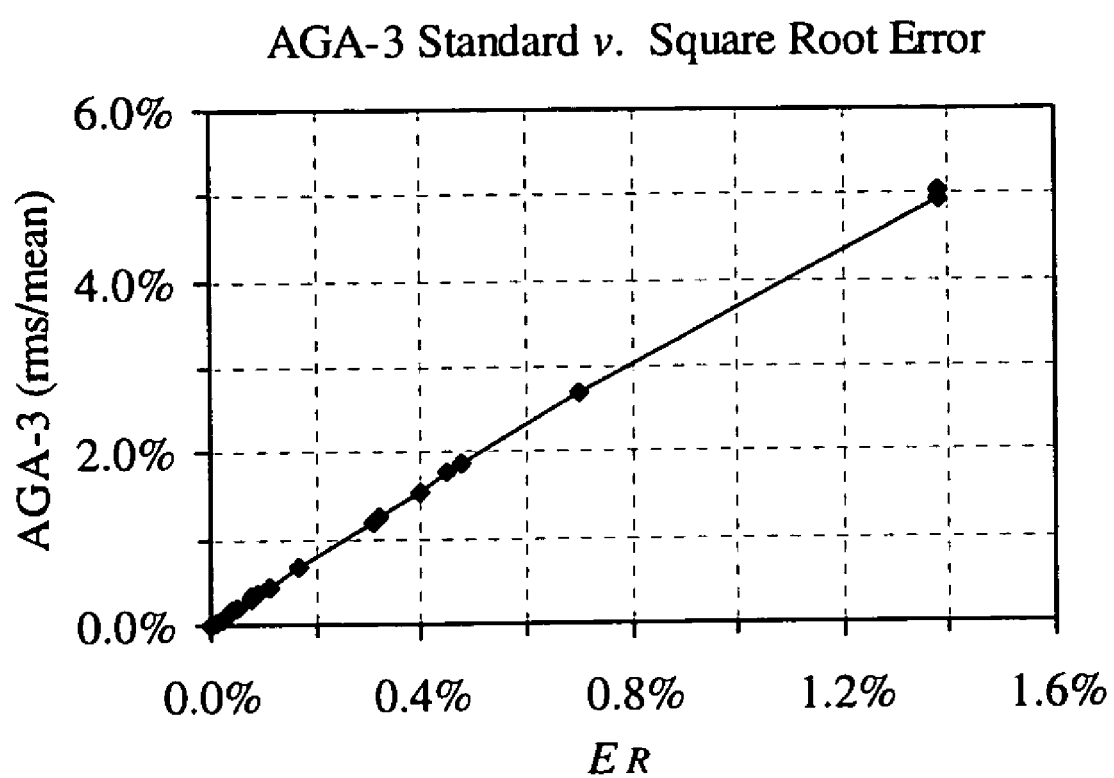
FIG. 6 is a plot showing a representative correlation between the AGA-3 pulsation standard and square root error.

FIG. 6 is a plot showing a representative functional relationship between the AGA-3 pulsation standard and the square root error, using the same data in FIGS. 5A and 5B. The AGA-3 pulsation standard (the ratio of the rms to the mean) is defined on the vertical axis, and ranges from zero to about five percent (0-5%, in relative deviation from unity). The square root error is defined along the horizontal axis, and ranges from zero to about one and a half percent (0-1.5%).

As shown in FIG. 6, the AGA-3 standard and the square root error are not linearly related, so the functions provide independent characterizations of the process pulsations. The most appropriate diagnostics thus vary with pulsation amplitude, sensor design and system configuration, and with the ratio of pulsation frequency to sampling rate.

Although the present invention has been described with reference to preferred embodiments, the terminology used is for the purposes of description, not limitation. Workers skilled in the art will recognize that changes may be made in form and detail without departing from the spirit and scope of the invention.

The invention claimed is:

1. A process pulsation diagnostic system comprising:
a primary element positioned to generate a differential pressure along a fluid flow;
a sensor positioned to sense the differential pressure across the primary element; and
a processor connected to the sensor, wherein the processor generates a pulsation diagnostic based on a standard deviation of the differential pressure, such that the pulsation diagnostic is indicative of process pulsations in the fluid flow.

2. The system of claim 1, wherein the processor further generates a pulsation indicator based on a change in the pulsation diagnostic.

3. The system of claim 1, wherein the pulsation diagnostic is indicative of an amplitude of the process pulsations via correlation with a square root error of the differential pressure.

4. The system of claim 3, wherein the processor further generates the square root error of the differential pressure based on the correlation with the pulsation diagnostic.

5. The system of claim 1, wherein the pulsation diagnostic is indicative of an amplitude of the process pulsations via correlation with a normalized root mean square of the differential pressure.

6. The system of claim 5, wherein the processor further generates the normalized root mean square of the differential pressure based on the correlation with the pulsation diagnostic.

7. The system of claim 1, further comprising an interface for transmitting the pulsation diagnostic over a loop wire having a maximum current of about 20 mA or less.

8. The system of claim 1, wherein the primary element comprises an orifice plate for generating the differential pressure.

9. The system of claim 1, wherein the primary element comprises a Pitot tube or an averaging Pitot tube for generating the differential pressure.

10. The system of claim 1, wherein the sensor samples the differential pressure at a sampling rate that is less than four times a frequency of the process pulsations.

11. The system of claim 10, wherein the sampling rate is less than twice the frequency of the process pulsations.

12. The system of claim 1, wherein a frequency of the process pulsations exceeds a sampling rate of the sensor.

13. A method for monitoring process pulsations, the method comprising:
sampling a differential pressure along a fluid flow at a sampling rate; and
generating a pulsation diagnostic as a function of the differential pressure, such that a change in the pulsation diagnostic is indicative of a change in an amplitude or frequency of the process pulsations;
wherein the function of the differential pressure comprises a standard deviation of the differential pressure; and
wherein the sampling rate is less than twice a frequency of the process pulsations.

14. The method of claim 13, wherein the sampling rate is at least 20 Hz.

15. The method of claim 14, further comprising generating a pulsation indicator as a function of an increase in the pulsation diagnostic.

16. The method of claim 13, wherein the pulsation diagnostic is correlated with a square root error of the differential pressure.

17. The method of claim 16, further comprising generating the square root error of the differential pressure based on the correlation with the pulsation diagnostic.

18. The method of claim 13, wherein the pulsation diagnostic is correlated with a root mean square of the differential pressure.

19. The method of claim 18, further comprising generating the root mean square of the differential pressure based on the correlation with the pulsation diagnostic.

20. The method of claim 13, further comprising transmitting the differential pressure and the pulsation diagnostic over a loop wire having a maximum current of about 20 mA or less.

21. A pressure monitoring device comprising:
a sensor positioned to sense a differential pressure;
a signal processor connected to the sensor, wherein the signal processor generates a process pressure value from the differential pressure;
a statistical processor connected to the sensor, wherein the signal processor generates a pulsation diagnostic based on a standard deviation of the differential pressure, such that the pulsation diagnostic is correlated with changes in an amplitude or frequency of the process pulsations; and an interface for transmitting the process pressure value and the pulsation diagnostic to a process system controller.

22. The device of claim 21, wherein the sensor has a sampling rate that is less than twice a frequency of the process pulsations.

23. The device of claim 21, wherein the device operates on no more than 50 mW of power.

24. The device of claim 21, further comprising a differential pressure generator positioned in a fluid flow in order to generate the differential pressure.

25. The device of claim 24, wherein the differential pressure generator comprises an orifice plate.

26. The device of claim 24, wherein the differential pressure generator comprises a Pitot tube or an averaging Pitot tube.

27. The device of claim 21, wherein the frequency of the process pulsations exceeds a sampling rate of the sensor.

* * * * *